United States Patent Office 3,214,448
Patented Oct. 26, 1965

3,214,448
14α-HYDROXYESTRONE AND ESTER THEREOF
Chester E. Holmlund, Pearl River, Louis I. Feldman, Spring Valley, and Karl J. Sax, West Nyack, N.Y., and Ralph H. Evans, Jr., River Vale, N.J., assignors to American Cyanamid Company, Stamford, Conn., a corporation of Maine
No Drawing. Filed July 27, 1962, Ser. No. 213,012
2 Claims. (Cl. 260—397.45)

This invention relates to the preparation of novel mono-oxygenated estrones. More particularly, it relates to the microbiological hydroxylation of 19-norandrostenedione at positions 14α and 15α, to the conversion of these compounds to the corresponding hydroxylated estrone by an additional microbiological process involving 1,2-dehydrogenation and to derivatives derived from the resulting products.

The steroids of the present invention can be illustrated by the following formulae:

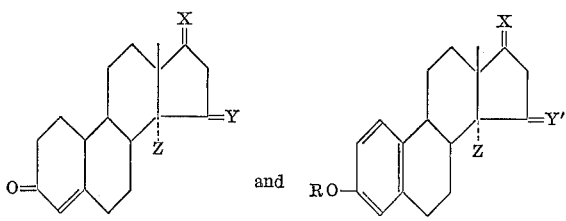

wherein X is selected from the group consisting of

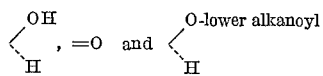

Y is selected from the group consisting of

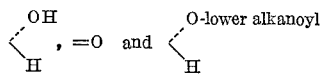

Y' is selected from the group consisting of

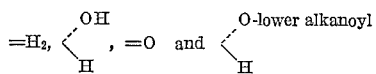

Z is selected from the group consisting of hydrogen and hydroxyl, R is selected from the group consisting of hydrogen and lower alkanoyl and Y' and Z do not simultaneously contain an oxgen function.

It is widely recognized that high serum cholesterol levels are associated with atheroma formation. Any compound which will reduce serum cholesterol is therefore useful for the treatment of cardiovascular and circulatory disorders associated with high serum cholesterol levels. The steroids 14α-hydroxyestrone, 15α-hydroxyestrone and their derivatives are pharmacologically active and are particularly efficaceous in lowering serum cholesterol without exerting corresponding feminizing effects. 15α-hydroxyestrone, for example, appears to be over 20% more effective than 15β-hydroxyestrone in lowering serum cholesterol in experimental animals.

These steroids may be illustrated by the following formula:

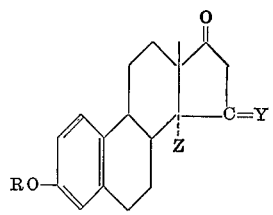

wherein R is selected from the group consisting of hydrogen and lower alkanoyl radicals and Y is selected from the group consisting of

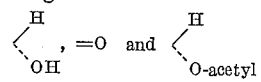

and Z is selected from the group consisting of hydrogen and hydroxyl.

In carrying out one aspect of the process of the present invention, 19-norandrostenedione is fermented with a species of the genus Fusarium such as *Fusarium roseum* ATCC No. 14,717) under aerobic conditions in a suitable nutrient medium in order to provide 15α-hydroxy-19-norandrostenedione.

After isolation the fermentation product, 15α-hydroxy-19-norandrostenedione, may be readily acetylated or oxidized to form the corresponding 15α-acetoxy and 15-keto derivatives. These compounds are of particular value in that they may serve as intermediates for the preparation of the hypocholesterolemic compounds bearing substituents at C–15α described in the preceding paragraph. For this purpose the 15-oxygenated-19-norandrostenedione is fermented with any culture capable of 1,2-dehydrogenating steroids. *Nocardia corallina* has been found to perform this reaction in high yield. The reaction is presumed to proceed as follows.

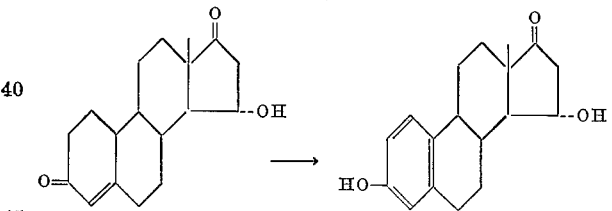

The corresponding 15α-hydroxylated estradiol is readily obtained by reducing 15α-hydroxyestrone with an alkali metal hydride.

In a similar manner 14α-hydroxy-19-norandrostenedione may be prepared by fermentation of 19-norandrostenedione with *Zygodesmus sp.* (ATCC No. 14,716) (Lederle Z-1028). After isolation, the 14α-hydroxy-19-norandrostenedione may be fermented with *Nocardia corallina* (ATCC 999) to provide 14α-hydroxyestrone. The latter compound can be reduced with an alkali metal hydride to provide the corresponding estradiol derivative.

*Fusarium roseum* has the following characteristics: culture on potato-dextrose agar spreading rapidly and covering the entire Petri dish in ten days; aerial mycelium raised, white, cottony; up to 4-5 mm. high, but becoming tinted with yellowish-brown in age. Central colony zones depressed and brownish. Reverse cream color (2) becoming mars brown (2) in central zones. Colorless to yellowish exudate in central areas. Cultural characteristics similar on malt extract agar, except large areas of the aerial growth are depressed and brownish. Enidate abundant in central zones forming pionnotes. Reverse Ochraceous-Orange (2) to Tawny (2). Cultures on Czapek's Solution Agar thin and spreading, covering the Petri dish in ten days. Aerial growth sparse, whitish. Sporulation very light. Reverse colorless. Macroconidia spindle to sickle-shaped and more or less pedicellate, 3–5 septate, $3–5\mu \times 20–50\mu$. Both ends of spores tapered; tapering more gradually at basal end; apical end strongly curved. Microconidia sparse, 1 or 2-celled, mostly spindle-shaped, $1.5–2.0\mu \times 4–8\mu$. Chlamydospores abundant; both terminal and intercalary; becoming brownish en masse. These species are described in detail by J. C. Gilman, "A Manual of Soil Fungi," second edition, Iowa State College Press, 1957; also by C. W. Hesseltine, unpublished thesis, University of Wisconsin, 1950. Fungi of the genus Fusarium are available from culture collection agencies such as American Type Culture Collection, Washington, D.C.; Northern Regional Research Laboratories, Peoria, Illinois; The Imperial Institute of Mycology, Kew, England; the Central Bureau voor Schimmel Culture, Baarn, Holland and so forth. During the growth of the organism under favorable conditions, a hydrogen atom in the $15\alpha$-position is replaced with a hydroxyl radical.

The exact mechanism of the hydroxylation is obscure, but it is the result of enzymes produced by the organism in the process of the growth.

Zygodesmus sp. (Z–1028) ATCC No. 14,716 has the following characteristics: colonies on corn meal agar thin, spreading, nearly covering the Petri dish in 21 days. Mycelium hyaline, but showing light brownish shades in sporulating zones. Hyphae tend to become funiculose in older portions of the colony. Colony reverse colorless to grayish. Conidiophores shrt, hyaline; giving rise acrogenously to dark, globose, 1-celled spiny to tuberculate conidia ($15–25\mu$). Spores borne singly. Colonies on potato-dextrose agar becoming 5–6 cm. in diameter in 21 days, forming a compact felt-like turf. Surface dark brownish (Benzo Brown of Ridgway) in central zones, lighter in margins. Reverse (Maroon) to black. Brownish diffusible pigment produced. Mycelium strongly funiculose. Sporulation heavy in central zones. Spores as on cornmeal agar, but tending to adhere together in short catenulate chains. Colonies on malt-extract agar covering the entire Petri dish in 21 days. Mycelial mat heavy, becoming Benzo Brown in central zones, shading to yellowish shades at margins. Cycelium tufted at margins. Sporulation light at margins but heavy in central areas. Reverse Maroon to black with orange-brown diffusible pigment. Spores as on potato-dextrose agar.

A suitable nutrient medium for either the Zygodesmus sp. or the Fusarium cultures contains a soluble source of carbon, nitrogen and mineral elements. Sources of carbon include sugars, such as glucose, sucrose, maltose, dextrose, xylose and galactose; also, alcohols, such as glycerol or mannitol; corn starch; organic acids such as citric acid, maleic acid and acetic acid; and various natural products containing carbohydrates such as corn steep liquor, soybean meal, cottonseed meal and many other available materials which have been used heretofore as a source of carbon in fermentation processes. Usually a variety of the above can be employed in the medium with good results.

Suitable sources of nitrogen include some of the above named materials, such as corn steep liquor, soybean meal, cottonseed meal and the like and various other substances, such as beef extract, casein, yeast, enzymatically digested proteins and degradation products including peptones, amino acids and many other available proteinaceous materials which have been found suitable in supporting the growth of fungi. Inorganic sources of nitrogen, including urea, ammonium salts, nitrates and the like may be used in the medium as a source of assimilable nitrogen to provide a favorable growth medium for the organism.

The mineral requirements of fermentation are usually supplied in the crude materials which are often used as sources of carbon and nitrogen or occur in water that is used in the process. However, it is usually advisable to supplement the minerals normally present with added amount to obtain a maximum microbial growth. Cations and anions which may be desirable in added amounts include sodium, potassium, calcium, magnesium, phosphate, sulphate, chloride, cobalt, manganese and various others. The use of trace elements such as boron, copper, cobalt, molybdenum and chrominum is often desirable.

The growth of the microorganisms takes place under aerobic conditions and, for example, aeration can be achieved in flasks by agitation on a reciprocating or rotary shaker. It is desirable that the sterile air be forced through the medium in an amount of from $\frac{1}{3}$ to 2 volumes of air per volume of medium per minute. Agitation in the bottles or fermenter tanks is provided by a mechanical impeller. The cultures will grow at temperatures between 5° and 45° C., but it is preferable to carry out the process using the same at a temperature of from 15° to 37° C.

To prepare the fermentation medium for bottle fermentation, 1.0 ml. of washed vegetative cell suspension of fungi of the genus Fusarium or of the Zygodesmus sp. from a potato dextrose agar slant is used to inoculate 100 ml. of sterile medium containing 2% molasses, 1% corn steep liquor, 1% corn starch and pH adjusted to about 7.0. This fermentation time may vary from about 1 to 144 hours or longer.

A preferred method of adding the substrate is to dissolve the steroid in ethanol, methanol or other water-miscible solvent and add the solution to the fermentation medium at the desired stage in the process. Although the steroid may precipitate from solution when so added, it is dispersed throughout the medium as a fine suspension and becomes readily available to the organism for hydroxylation. The amount of steroid added to the fermentation may vary considerably, but it is generally on the order of 0.1 to 1.0 gram per liter of medium.

During the fermentation process it may be desirable to add antifoaming agents, such as silicones, glyceride oils and the like. These compounds are added from time to time and in the amounts needed.

In the process of the present invention using shaker tubes, the 10 ml. batches of inoculated medium in 100 ml. shaker tubes are usually incubated for a period of about 20 to 50 hours at a temperature of about 28° C. At this point, 2 mgm. of sterile substrate dissolved in 0.2 ml. of methanol is added to each tube and the fermentation is continued at about 28° C. The fermentation is allowed to proceed for a sufficient period of time to achieve maximum conversion of the 19-norandrostenedione steroid to the hydroxylated 19-norandrostenedione steriod. This period of time may vary from 1 to 144 hours or longer.

At the conclusion of the fermentation process, the desired $15\alpha$-hydroxy or $14\alpha$-hydroxy steroid is recovered from the fermentation medium by the following procedure which describes in particular a 10 ml. fermentation. This is a general procedure and is operative for fermentations of various sizes.

The contents of a fermentation tube is extracted with three volumes of ethyl acetate. The extracts are pooled and the resulting solution evaporated to dryness under reduced pressure. The dried residue is dissolved in a mixture consisting of a 1:1 ratio of water, saturated with ethyl acetate, and methanol. This solution is used for characterization of steroid content as described hereinafter.

In large-scale fermentations, the crude product or products may be recovered from the fermentation beer by simple solvent extraction, using a suitable water-immiscible solvent, such as chlorinated lower hydrocarbons, alcohols, esters, ketones and so forth. Further purification and separation of steroid products from extracts may be accomplished by methods well understood by those skilled in the art. Separation and purification of steroid mixtures often require the use of chromatography, as described hereinafter in the examples.

The preparation of 14α-hydroxy steroids and 15α-hydroxy steroids and their conversion to other steroids can be illustrated by the following flowsheet.

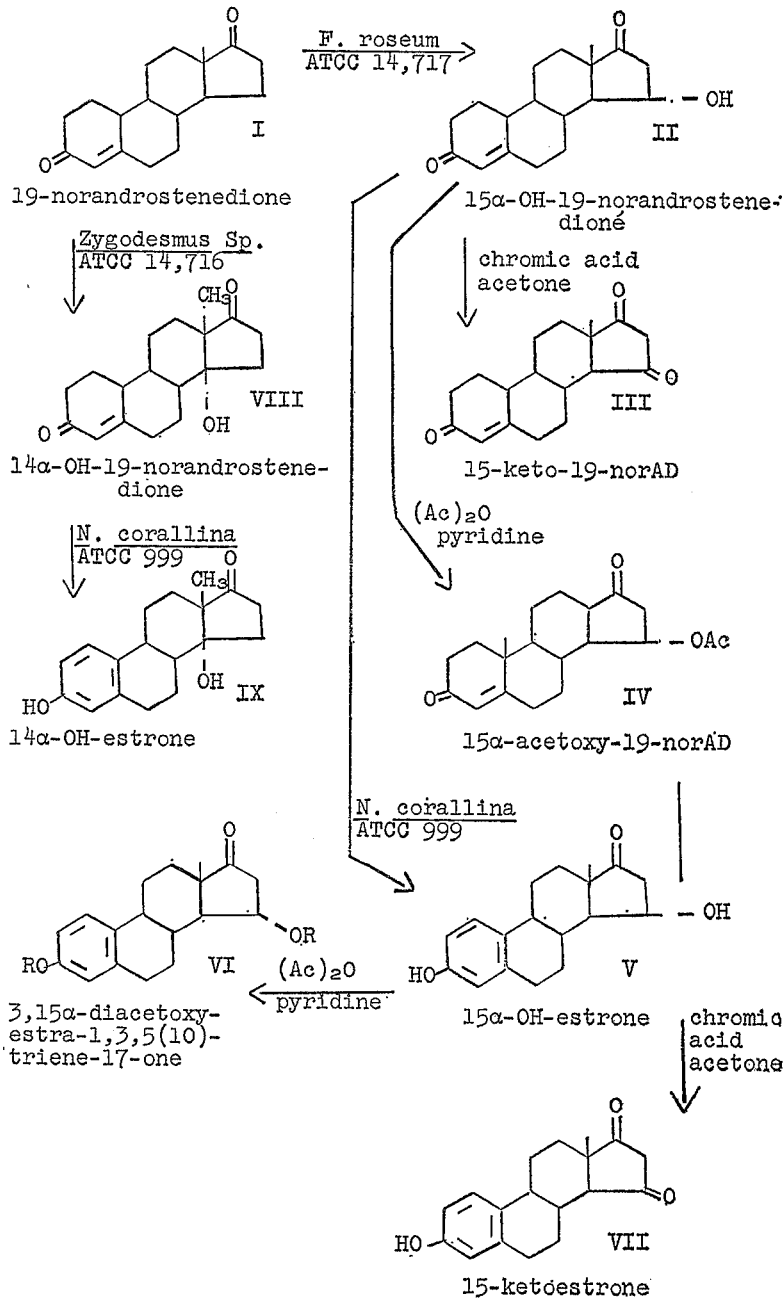

wherein R is an acyl radical.

The following examples described in detail the preparation of 15α-hydroxy steroids using species of the genus Fusarium, the preparation of 14α-hydroxy steroids by Zygodemus sp., and conversion of these steroids into other useful steroids.

*Example 1.—15α-hydroxylation of 19-norandrostenedione*

A 500 ml. Erlenmeyer flask containing 100 ml. of sterile aqueous medium containing molasses, 2%, corn starch, 1% and corn steep liquor, 1% is inoculated with 5 ml. of 48 hour inoculum of *Fusarium roseum* (ATCC No.

14,717) (Z–1035). The flask is incubated on reciprocating shaker (120 oscillations/min., 2″ stroke) at 28° C. for 24 hours, at which time 20 mg. of 19-norandrostenedione dissolved in 1 ml. of methanol is added to the fermentation and incubation is continued. Twenty-four hours after steroid addition, paper chromatographic assay shows 40% 15α-hydroxy-19-norandrostenedione ∼20% 6β-hydroxy-19-norandrostenedione and ∼30% starting material. The fermentation mash is then extracted with ethyl acetate (3 volumes), and the extract is evaporated to dryness. The residue is partitioned on a 10 g. diatomaceous earth column using the system, water:methanol:dioxane:cyclohexane in the proportion 2:2:6:10, respectively. 15α-hydroxy-19-norandrostenedione is obtained at 14.8 column retention volumes in 49% yield.

*Example 2.—15α-hydroxylation of 19-norandrostenedione*

The fermentation of 19-norandrostenedione with *Fusarium roseum* (ATCC No. 14,717) is carried out under the conditions described in Example 1. Assay 24 hours after addition of steroid indicates 40% 15α-hydroxy-19-norandrostenedione and less than 10% starting material. The fermentation extract is treated as described in Example 1 and the residue is partitioned on diatomaceous earth using the system, water:methanol:dioxane:cyclohexane in the proportions 2:2:8:10. 15α-hydroxy-19-norandrostenedione is obtained at 8.0 column retention volumes in 29% yield.

*Example 3.—Isolation of 15α-hydroxy-19-norandrostenedione*

Four grams of 19-norandrostenedione is fermented with *Fusarium roseum* (ATCC No. 14,717) in a manner similar to that described in Example 1. When the substrate has essentially disappeared, as determined by paper chromatography, the fermentation mash is extracted three times with equal volumes of chloroform. The chloroform extract is concentrated to dryness, and an aliquot equivalent to 20 mg. of steroid is partitioned on a 20 g. diatomaceous earth column using a 2:2:8:10 solvent system (refer to Example 2 for composition). Two products, 6β-hydroxy-19-norandrostenedione (21%), and 15α-hydroxy-19-norandrostenedione (46%), are found at 2.4 and 6.6 holdback volumes, respectively.

The residue from the evaporation of the chloroform extract is fractionally crystallized from acetone-hexane and from ethyl acetate-hexane to yield 926 mg. (21%) of 15α-hydroxy-19-norandrostenedione, melting point 197.5–200°, $[\alpha]_D^{25}+144°$ (CH$_3$OH), $\lambda_{max}$ 240 mμ, ε 15,850. The mixture obtained on evaporation of the mother liquors is chromatographed on an 800 g. diatomaceous earth column using a 2:2:8:10 solvent system. An additional 14.5% of 15α-hydroxy-19-norandrostenedione is found at 11.3 HBV (holdback volume). The product is crystallized three times from acetone-ethyl acetate-hexane to yield 456 mg. of 15α-hydroxy-19-norandrostenedione, melting point 200.5–202° C., $[\alpha]_D+146°$ (CH$_3$OH).

*Example 4.—Preparation of 15α-acetoxy-19-norandrostenedione*

One hundred mg. of 15α-hydroxy-19-norandrostenedione in 8.5 ml. of pyridine and 2 ml. of acetic anhydride is allowed to react for 16 hours and the product is isolated by methylene chloride extraction of the acidified reaction mixture. The crude product obtained on evaporation of the methylene chloride is purified by partition chromatography on a 50 gm. diatomaceous earth column using a 2:4:1:10 solvent system (water:methanol:dioxane:cyclohexane). The material obtained from the eluate at 7.7 holdback volumes is crystallized twice from acetone-hexane to yield 56 mg. of 15α-acetoxy-19-norandrostenedione, melting point 146.5–147.5° C., $[\alpha]_D+128°$ (CH$_3$OH), $$\lambda_{max.}^{CH_3OH} \ 239 \ m\mu$$

ε 18,100. The analytical data indicate solvation.

*Example 5.—Preparation of 19-norandrostene-3,15,17-trione*

A solution of 100 mg. of 15α-hydroxy-19-norandrostenedione in 31 ml. of an oxidizing solution (a 1–100 dilution in acetone of a stock solution of chromic acid consisting of 20 g. chromium trioxide in 100 ml. of 50% sulfuric acid) is allowed to react for 10 minutes and the solution is treated with methanol. After 5 minutes the solution is diluted with 200 ml. of water and the mixture is extracted with chloroform. The extract is evaporated to a residue which is purified by partition chromatography on a 50 g. diatomaceous earth column using a 2:2:4:10 solvent system (water:methanol:dioxane:cyclohexane). The eluate at 5.9 holdback volumes is concentrated and the product is crystallized from the acetone-hexane to yield 30 mg. of 15-keto-19-norandrostenedione, melting point 149–150.5° C., $[\alpha]_D^{25}+70°$ (CH$_3$OH), $$\lambda_{max.}^{CH_3OH} \ 220 \ m\mu$$

ε 18,00. The ultraviolet absorption spectrum in 1% alcoholic potassium hydroxide solution shows maxima at 241 mμ, ε 16,600 and 274 mμ, ε 18,750. The product appears to be solvated.

*Example 6.—Preparation of 15α-hydroxyestrone*

A solution of 0.8 g. of 15α-hydroxy-19-norandrostenedione in 40 ml. of methanol is added during stirring to a suspension of 40 g. of lyophilized cells of *Nocardia corallina* (ATCC 999) and 0.4 g. of phenazine methosulfate in 4.0 liters of 0.05 M tris (hydroxymethyl) aminomethane adjusted to pH 7.6 with dilute hydrochloric acid. The mixture is transferred in 100 ml. portions to forty 500 ml. Erlenmeyer flasks which are incubated during shaking at 28° C. The reaction is permitted to proceed for 26½ hours at which time spectrophotometric assey indicates an 80% yield of phenolic steroid. The contents of the flasks are combined and the mixture is extracted with an equal volume of chloroform. The aqueous layer is separated and is extracted three times with one-half its volume of chloroform, and the chloroform extracts are combined. Evaporation of the chloroform leaves a residue which is dissolved in 100 ml. of dichloromethane. The solution is placed on a column of silica gel (50 g., 60–200 mesh), and the column is washed with 200 ml. of a mixture composed of equal parts of dichloromethane and heptane, 800 ml. of a mixture of equal parts of dichloromethane and chloroform, 800 ml. of chloroform, 200 ml. of 5% acetone-chloroform and 80 ml. of 20% acetone-80% chloroform. The 15α-hydroxyestrone is found in the 5% acetone-95% chloroform and the first 200 ml. of the 20% acetone-80% chloroform eluates. The crude 15α-hydroxyestrone is further purified by partition chromatography on a column consisting of 150 g. of diatomaceous earth moistened with 75 ml. of the lower phase of a solvent system composed of water, methanol, dioxane and cyclohexane in the volume ratio 1:1:5:5. Elution with the upper phase of the above solvent system provides a fraction (1500 ml.–2800 ml.) containing the 15α-hydroxyestrone. Fractional crystallization from methylene chloride-hexane of the residue from the concentration of this fraction yields 423 mg. (53%) of 15α-hydroxyestrone, melting point 232–233° C.

$[\alpha]_D^{25} +222°$ (CH$_3$OH)

$[\alpha]_D^{25} +210°$ (pyridine).

*Example 7.—Preparation of 15-ketoestrone*

A solution of 59 mg. of 15α-hydroxyestrone in a mixture of 31 ml. of acetone, 0.064 g. of chromic anhydride, 0.102 g. of sulfuric acid, and about 0.75 ml. of water is allowed to stand at room temperature for ten minutes. Several drops of methanol is added and after five minutes the mixture is diluted with water and extracted with dichloromethane. The dichloromethane extract is concentrated to a residue which is subjected to partition chromatography. Concentration of the appropriate fraction and crystallization of the residue yield 7 mg. of 15-ketoestrone, melting point 196–199.5° C.

$[\alpha]_D^{25} +130°$ (CHCl$_3$)

*Example 8.—Preparation of 3,15α-diacetoxy-estra-1,3,5(10)-triene-17-one*

A solution of 1 mg. of 15α-hydroxyestrone in 0.9 ml. of pyridine and 0.1 ml. of acetic anhydride is allowed to stand for 24 hours at room temperature. Paper chromatography shows a substantially complete conversion of the starting material to the 3,15α-diacetate.

*Example 9.—Preparation of 14α-hydroxy-19-norandrostenedione*

A potato dextrose agar slant of Zygodesmus sp. (ATCC No. 14,716) (culture Z-1028) is washed with sterile 0.9% sodium chloride solution and inoculated into a 250 ml. Erlenmeyer flask containing 50 ml. of medium consisting of corn steep liquor (10 g./l.), corn starch (10 g./l.) and molasses (20 g./l.) (pH 7.0). This inoculated medium is incubated at 28° C. on a reciprocating shaker. Five ml. of the resulting growth is inoculated into 100 ml. of the same medium in a 500 ml. Erlenmeyer flask and incubated as above for 24 hours. At this time 20 mg. of 19-norandrostenedione dissolved in 2 ml. of methanol is added to the mash. Incubation is continued under the same conditions for 24 hours at which time paper chromatographic assays indicate a good yield of 14α-hydroxy-19-norandrostenedione.

*Example 10.—Preparation and isolation of 14α-hydroxy-19-norandrostenedione*

To a stainless steel fermenter is added 400 g. of molasses, 200 g. of corn starch, 200 g. of corn steep liquor, and sufficient tap water to make 20 liters of solution. The pH of the solution is adjusted to 7.0 with 10 N ammoniumhydroxide. After sterilization at 120° C. for 45 minutes, the solution is cooled to 27° C. An inoculum is prepared by shaking 100 ml. of sterile medium of the above composition with a pure culture of Zygodesmus sp. ATCC No. 14,716 for two days at 28° C., adding this suspension to one liter of the same sterile medium and incubating at 28° C. during shaking for two days. The inoculum is added to the contents of the fermenter until sterile conditions and growth is continued during stirring at 800 r.p.m. at 25.5–27.8° C. with an air flow of 20 liters per minute for 22 hours. A solution of 4.0 g. of 19-norandrostenedione in 200 ml. of methanol is added to the fermentation and stirring and aeration are continued for 37 hours. The fermentation mixture is stirred with an equal volume of chloroform and filtered. The chloroform layer is separated and the aqueous filtrate is extracted twice with equal volumes of chloroform.

Concentration of the combined chloroform extract leaves an oil which is subjected to partition chromatography on a 700 g. column of diatomaceous earth moistened with the lower phase of a solvent system composed of water, methanol, dioxane, and cyclohexane in the volume ratio 1:1:4:5. After development of the column with about 8 retention volumes of the upper phase of the above solvent system the desired 14α-hydroxy-19-norandrostenedione is obtained as a mixture with another product. Acetylation of the mixture with acetic anhydride in pyridine solution and chromatography on 50 g. of silica gel of the mixture thus obtained yields 14α-hydroxy-19-norandrostenedione in the 90% methylene chloride-10%-acetone fraction. Concentration of the solution with n-hexane yields 320 mg. (8%) of crystalline steroid, melting point 175.5–179.5° C. The analytical sample, melting point 180.5–182° C.

$$\lambda_{max.}^{CH_3OH}\ 238\ m\mu$$

$\epsilon 17,300$ $[\alpha]_D^{25}+107°$ C. ($CH_3OH$) analyzes correctly for 14α-hydroxy-19-norandrostenedione.

*Example 11.—14α-hydroxyestrone (3,14α-dihydroxyestra-1,3,5(10)-triene-17-one)*

To a suspension of 10 g. of lyophilized cells of *Nocardia corallina* (ATCC 999) in 1000 ml. of 0.05 M tris (hydroxyethyl) aminomethane adjusted to pH 7.6 with hydrochloric acid is added 100 mg. of phenazine methosulfate and 200 mg. of 14α-hydroxy-19-norandrost-4-ene-3,17-dione. After shaking for 2 hours at 24° C., paper chromatographic and spectrophotometric assays show a 51% conversion to 14α-hydroxyestrone. The pH of the mixture is adjusted to 6.5 with hydrochloric acid and the steroid is extracted three times with one liter portions of chloroform. The highly colored extract is dried over magnesium sulfate, filtered, and the filtrate is treated with 2 g. of decolorizing carbon and filtered. Concentration of the filtrate under reduced pressure yields an oil which is subjected to partition chromatography on a column of 100 g. of diatomaceous earth moistened with the lower phase of a mixture of water, methanol, dioxane, and cyclohexane in the volume ratio 1:1:3:5. The column is developed with the upper phase of the above mixture and with the upper phases of mixtures of the same solvents in the volume ratios 2:2:8:10 and 2:2:10:10. The 14α-hydroxyestrone is found at about 7 column retention volumes of eluate. The steriod obtained on evaporation of the solvent is dissolved in a mixture of benzene and ether and is extracted therefrom with 5% aqueous sodium hydroxide solution. Acidification of the aqueous solution with hydrochloric acid and extraction of the steriod with methylene chloride yields crude 14α-hydroxyestrone on evaporation of the methylene chloride extract. Crystallization of the residue from methylene chloride-hexane and acetone-hexane yields 18 mg. of 14α-hydroxyestrone, melting point 280–285° C. (decomposes) $[\alpha]_D^{25}+163°$ (pyridine).

We claim:
1. The compound 14α-hydroxyestrone.
2. The compound 3-acetoxy-14α-hydroxyestrone.

References Cited by the Examiner

UNITED STATES PATENTS

| | | | |
|---|---|---|---|
| 2,666,016 | 1/54 | Hechter et al. | 195—51 |
| 2,756,179 | 7/56 | Fried et al. | 195—51 |
| 2,936,312 | 5/60 | Babcock et al. | 260—397.4 |
| 2,937,192 | 5/60 | Colton | 260—397.4 |
| 3,031,472 | 4/62 | Bernstein et al. | 260—397.4 |

OTHER REFERENCES

Bernstein et al., Chemistry and Industry, February 1956, page 111 relied on.

LEWIS GOTTS, *Primary Examiner.*

UNITED STATES PATENT OFFICE
CERTIFICATE OF CORRECTION

Patent No. 3,214,448

October 26, 1965

Chester E. Holmlund et al.

It is hereby certified that error appears in the above numbered patent requiring correction and that the said Letters Patent should read as corrected below.

Column 2, line 21, for "ATCC" read -- (ATCC --; column 3, line 33, for "shrt" read -- short --; line 46, for "Cycelium" read -- Mycelium --; column 4, line 4, for "amount" read -- amounts --; line 52, for "steriod" read -- steroid --; column 5, line 66, for "described" read -- describe --; column 8, line 5, strike out "the", second occurrence; line 25, for "assey" read -- assay --; line 38, for "80 ml." read -- 800 ml. --; column 9, lines 28 and 29, for "ammoniumhydroxide" read -- ammonium hydroxide --; column 10, line 1, for "175.5" read -- 174.5 --; line 15, for "2" read -- 25 --.

Signed and sealed this 19th day of July 1966.

(SEAL)
Attest:

ERNEST W. SWIDER
Attesting Officer

EDWARD J. BRENNER
Commissioner of Patents